(12) United States Patent
Rampley (10) Patent No.: US 10,160,366 B1
(45) Date of Patent: Dec. 25, 2018

(54) ROLLBACK DUMP TRUCK

(71) Applicant: Kevin Lee Rampley, Jackson, MO (US)

(72) Inventor: Kevin Lee Rampley, Jackson, MO (US)

( * ) Notice: Subject to any disclaimer, the term of this patent is extended or adjusted under 35 U.S.C. 154(b) by 0 days.

(21) Appl. No.: 15/832,423

(22) Filed: Dec. 5, 2017

Related U.S. Application Data

(60) Provisional application No. 62/448,027, filed on Jan. 19, 2017.

(51) Int. Cl.
*B60P 1/32* (2006.01)
*B60P 1/16* (2006.01)
*B60P 1/64* (2006.01)
*B60P 1/28* (2006.01)

(52) U.S. Cl.
CPC ............ *B60P 1/32* (2013.01); *B60P 1/162* (2013.01); *B60P 1/28* (2013.01); *B60P 1/6454* (2013.01)

(58) Field of Classification Search
CPC .... B60P 1/32; B60P 1/162; B60P 1/28; B60P 1/645
USPC .......... 298/12–14, 16, 17 B, 19 B, 22 P, 38; 414/477–480
See application file for complete search history.

(56) References Cited

U.S. PATENT DOCUMENTS

| | | | |
|---|---|---|---|
| 3,450,282 A | | 6/1969 | Ezolt |
| 4,139,236 A | * | 2/1979 | Hill ........................... B60P 1/30 298/22 P |
| 4,243,267 A | * | 1/1981 | Meyers ................... B60P 1/283 298/17 B |
| 5,192,189 A | | 3/1993 | Murata et al. |
| 5,249,909 A | * | 10/1993 | Roberts ............... B60G 17/033 414/476 |
| 6,547,335 B2 | | 4/2003 | McSweeney |
| 7,377,592 B2 | | 5/2008 | Kraenzle |
| 7,401,860 B2 | | 7/2008 | Kraenzle |
| 7,914,082 B2 | | 3/2011 | Kraenzle |
| 8,348,586 B2 | | 1/2013 | Jaeger et al. |
| 8,444,365 B2 | | 5/2013 | Duell et al. |
| 8,746,804 B2 | | 6/2014 | Kraenzle |

FOREIGN PATENT DOCUMENTS

CA 990762 A 6/1976

* cited by examiner

*Primary Examiner* — Stephen T Gordon
(74) *Attorney, Agent, or Firm* — Creativenture Law, LLC; Dennis JM Donahue, III; Kevin C. Staed

(57) ABSTRACT

A rollback dump truck having a chassis, a support frame, a bed frame, and a latching extension. The chassis further having at least one rear axle laterally extending between two sides and a pivotal axis parallel and rearward thereof. The subframe assembly is positioned above and supported by the chassis and is operatively connected thereto at a hinge point aligned with the pivotal axis. The subframe assembly may pivot about the hinge point away from the chassis to positions that include a dump position and a load position. Additionally, the bed frame may slide relative to the support frame in the load position while the load angle is held constant by the latching extension.

20 Claims, 8 Drawing Sheets

FIG. 2

ROLLBACK DUMP TRUCK

CROSS-REFERENCE TO RELATED APPLICATIONS

This application is a utility application claiming priority from U.S. Provisional Patent Application No. 62/448,027 filed on Jan. 19, 2017 which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to combination dump trucks having both dumping and loading capabilities, and more particularly to a restrictor that may hold the truck bed at a certain angle when used for loading vehicles or equipment, but also allows the truck bed to achieve a dump angle greater than the load angle when dumping.

Related Art

Prior art dump trucks and rollback trucks are widely known and have traditionally been used to accomplish different tasks. Dump trucks have beds that are typically used for hauling and dumping loads of material like rock, gravel, and dirt. As it is the object of a dump truck to efficiently dump the load it is carrying, the beds of these trucks can be inclined from their horizontal load and transportation angle to a high dump angle, optimally greater than forty degrees (>40°) to ensure that the load falls out of the inclined bed.

Conversely, rollback trucks are generally used for hauling vehicles, equipment, machinery, cargo carriers, or products which are rolled, driven, or winched onto the bed of the rollback truck and similarly rolled off after being hauled to the destination. The bed of rollback trucks are inclined from a horizontal transportation angle to a load angle, and then the bed slides backwards until the rear end of the bed reaches the ground for loading and unloading operations (generally referred to as loading operations). To facilitate the loading operations, the load angle is significantly lower than the dump angle of dump trucks, traditionally less than twenty degrees (<20°) and optimally between ten to fifteen degrees (10°-15°).

It has been known to combine the features of a dump truck with the slideable bed frame of a rollback truck to produce a rollback dump truck. Generally, a dumping actuator, such as a telescoping piston, a multistage hydraulic hoist, or a scissor hoist, is used to raise the front end of the bed frame away from the chassis around a pivot axis that is at the back end of the bed frame rearward of the rear wheel axis. In rollback dump trucks, the same dumping actuator that is used to incline the bed frame to the dump angle is also used to incline the bed frame to the lower rollback loading angle. While the bed is at the rollback loading angle, a sliding actuator moves the bed frame backwards to its loading/unloading position where the back of the angled bed frame rests on the ground. Accordingly, these trucks have a dual-purpose bed which has both a dumping mode of operation and a rollback mode of operation.

Although there can be advantages to the dual-purpose bed in rollback dump trucks, prior art designs have traded off some beneficial aspects of the rollback truck bed in order to provide the dumping capability thereby resulting in significant limitations in the operating envelope for the rollback loading operations. For example, most rollback trucks use a two-way actuator that limits the bed's inclination angle to a loading angle that is less than twenty degrees (<20°) and also provides a holdback functionality so that the bed will not over-rotate (exceeding the loading angle) when there is a load on the bed and the slide actuator moves the bed longitudinally between its retracted position and its extended position. With the holdback functionality, the back of the bed can come off of the ground at the rollback loading angle set by the two-way actuator as the bed frame slides longitudinally relative to the support frame. For traditional rollback trucks, the rollback loading angle can be maintained even when the center of gravity of the load and the bed are located behind the pivot point. However, as indicated above, in order to reach the inclination angle required for the dumping operations, rollback dump trucks have used the dumping actuator to incline the bed to both the steep dumping angle and the shallow rollback loading angle, but the dumping actuator has a much lower holdback force as compared to the two-way actuator. Without the holdback force of the two-way actuator, there is nothing to stop the back of the bed from continuing to be forced down on the ground when the center of gravity of the load and bed are behind the pivot point during rollback loading operations, and this results in the over-rotation of the bed to angles that exceed the preferred rollback loading angle. If the over-rotation of the bed remains within the operating range of the system as the bed is longitudinally retracted, the bed could ultimately be lowered to its horizontal orientation when the center of gravity moves close to or forward of the pivot point.

Known rollback dump trucks have relied entirely on dumping-type actuators to incline the bed to the rollback loading angle, and dumping actuators typically do not have much holdback force. Therefore, to avoid the over-rotation of the bed during rollback loading operations, prior art rollback dump trucks have significantly reduced the operating envelope for the loads that can be handled during the rollback loading and unloading conditions. The dumping actuators used in the prior art systems typically have some holdback force but it is only a fraction of the holdback force necessary for the full rollback operating envelope that is available to standard rollback trucks. Prior art rollback dump trucks have suggested different ways to lock a rollback load angle using one or more brackets or legs that support the bed frame from the ground, but these brackets and legs cannot maintain the same rollback load angle while the bed slides along its entire longitudinal axis. Therefore, prior art systems have included limiters which prevent the bed from sliding when the system senses a condition that has the potential to result in over-rotation of the bed.

A rollback dump truck with a dumping actuator that has limited holdback force can incline the bed to a rollback loading angle that is between fourteen degrees (14°) and twenty degrees (20°) and may prevent smaller loads from over-rotating the bed, such as disclosed in U.S. Pat. No. 5,192,189. However, without the holdback force sufficient to lock the rollback load angle, it is possible for the bed to over-rotate. The '189 patent discloses legs at the back of the bed which contact the ground when the bed is fully extended in the rollback loading operation and support the back of the bed. A particular embodiment of the legs in the '189 patent even discloses a roller at the base of one of the legs. The '189 patent allows the bed to slide all the way up to an upper limit angle of approximately twenty degrees (20°) so the bed could actually rotate between fourteen degrees (14°) and twenty degrees (20°) while the bed is moved along its longitudinal axis and the rollers engage the ground. According to the '189 patent, once the upper limit angle is reached, the limit detector would de-energize the solenoid that operates the slide actuator to prevent any further sliding of the bed.

The problem with over-rotation of the bed during rollback loading operations caused by the loaded bed's center of gravity being moved behind the axis of rotation is expressly addressed U.S. Pat. No. 8,746,804. However, rather than offer a solution to the over-rotation problem, the '804 patent places limitations on the slide frame that are similar to those disclosed in the '189 patent. The '804 patent explains that it is possible to have an "overhung load that must be supported by the dump frame actuator(s)" but the overhung load could apply a force that could overwhelm the actuators and cause a failure. To prevent this situation from occurring, the '804 patent suggests the use of sensors that can determine "imminent or approaching failure or overload condition" so the system can automatically stop and shut down the slide frame actuator to prevent further sliding of the slide frame. The '804 patent does not disclose or suggest any solution for the system to overcome the overhung load force when it is too great for the dump frame actuator to handle on its own so that the slide frame can continue the sliding operation. Instead, the systems in both the '804 patent and the '189 patent would shut down the sliding operation in order to prevent the overhung load force from exceeding the limits of the dump frame actuator. Accordingly, the prior art generally teaches that the operating envelope of the rollback loading operations must be limited to avoid any conditions which would overload the dump frame actuator or would otherwise overpower the force to pull down the front of the bed, such as an excessive overhung load.

There are many different loading conditions which could not be performed in the limited operating envelope that result from following the teachings of the '804 patent and the '189 patent. In fact, the overhung load problem is worsened for loads that have the center of gravity at increasing heights above the bed because when the bed is inclined in the rollback loading angle, the center of gravity moves backwards a distance that is equal to the product of the center of gravity's height above the bed with the sine of the rollback loading angle, i.e., $d_{back}=h_{cg}*sine(\alpha_{rl})$. It is possible that the center of gravity of a load may not extend forward of the hinge point while the bed is in its rollback loading angle, in which case the rollback loading operation would fail if the load would overload the dump frame actuator. Therefore, it would be beneficial to solve the overhang problem with a device that would allow the bed to remain within its allowable range of loading angles even for loads that would overload the dump frame actuator without such a device. Such an improvement would expand the operating envelope for the rollback loading operations without compromising the safety of the system.

SUMMARY OF THE INVENTION

Embodiments of the present invention comprise a rollback truck having a chassis, a support frame, a bed frame, and a latching extension, where the bed frame and the support frame collectively form a subframe assembly. The chassis further has at least one rear axle laterally extending between two sides. The subframe assembly is positioned above and supported by the chassis and is connected thereto at a hinge point proximate to and parallel with the rear axle. In this configuration, the subframe assembly may pivot about the hinge point away from the chassis to positions that include a dump position and a load position.

In the dump position, a dump angle is formed between the subframe assembly and the chassis of at least thirty-five degrees (35°) and in the preferred embodiment is around forty-five degrees (45°). Conversely, a load angle is formed when the rollback dump truck is in the load position. The load angle is less than the dump angle and in the preferred embodiment is less than twenty degrees (20°) and is preferably between nine degrees (9°) and fifteen degrees (15°). Accordingly, a pivotal actuator moves the subframe assembly between a horizontal position substantially parallel to the chassis, the load position and the dump positions.

In another aspect of the rollback dump truck a slide actuator moves the bed frame relative to the support frame when the subframe assembly is in the load position. In operation, the bed frame is angled towards the ground, such as at a thirteen (13°) degree load angle, and extends behind the chassis until it comes to rest. Additionally, the latching extension connects the chassis and support frame and subsequently locks the load angle. The latching extension counteracts the effect of gravity and the weight of the load as the center of gravity of the load moves further past the hinge point while the bed frame is being extended. Conversely, the latching mechanism holds the subframe assembly at the load angle and prevents the subframe assembly from returning to a position parallel with the chassis when the subframe assembly is not extended by the sliding actuator.

Further areas of applicability of the present invention will become apparent from the detailed description provided hereinafter. The detailed description and specific examples of the invention in the specification and drawings are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

A rollback dump truck 10 having a chassis 12, a support frame assembly 14, a bed frame assembly 16, and a latching extension 18. The chassis is preferably a vehicle chassis commonly used in trucks having one or more rear axles spanning the sides of the chassis 40, parallel with the chassis' front end 36 and rear end 38, and capable of hauling large loads. The support frame and bed frame collectively form a subframe assembly 76 that is mechanically connected to and supported by the chassis. The support frame is connected to the chassis proximate to the rear axle 42 and further has a hinge point located rearward of the rear axle. The hinge point defines a pivot axis 44 about which the subframe assembly rotates relative to the chassis. A pivotal actuator 52 moves the subframe assembly between a horizontal orientation and either a rollback load angle orientation for rollback loading operations or a dumping angle orientation for load dumping operations. The bed frame assembly is connected to the support frame assembly and slides along a longitudinal axis 46 that is perpendicular to the pivot axis, moving between a forward position 26a and a rearward position 26b. A slide actuator 56 moves the bed frame relative to the support frame between the forward retracted position and a rearward extended position. Accordingly, the front end of the subframe assembly may pivot vertically away from the chassis about the pivot axis, and the bed frame slides along the longitudinal axis relative to the support frame. In the extended position, the rear edge of the subframe's bed frame slides to the rearward position with the rear edge resting on the ground.

An aspect of the rollback dump truck is a latching extension connecting the chassis and support frame together while in the loading position 24 discussed below. In the preferred embodiment, illustrated in FIGS. 5A and 5B the first proximal end 48 of the latching extension is fixedly attached to the chassis proximate to its front end and the second distal end 50 of the latching extension removably engages a portion of the support frame forward of the rear axle. A person of skill in the art will recognize that the latching extension could be rotated by an actuator 62, such as a hydraulic actuator, an air actuator, an electric actuator, or may be manually positioned by an operator. Regardless of the particular actuating means, it is an aspect of the latching extension to have a position where the latching extension is engaged 28 and another position where the latching extension is stowed 30 by a latch engaging mechanism.

Figure 6:
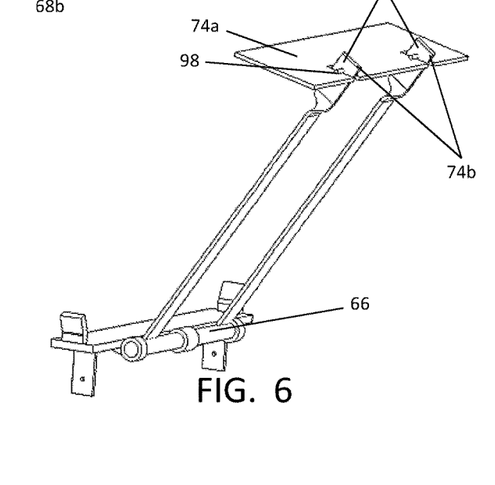
FIG. 6 is a perspective view of an alternative embodiment of the latching extension.
Figure 7A:
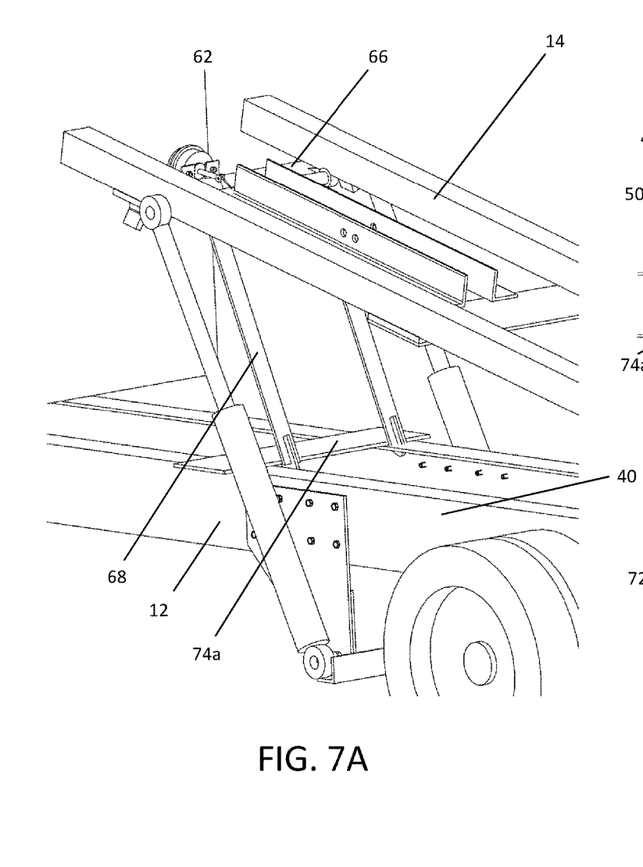
FIGS. 7A and 7B are a perspective view and a side view respectively of an alternative embodiment of the latching extension mounted to the subframe assembly and extending to the chassis.
Figure 7B:
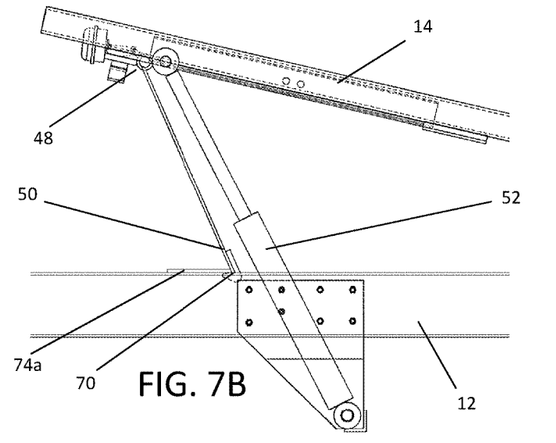

In another aspect of the preferred latching extension, the support frame has a locking plate 74a to which the latching extension removably attaches, as shown in FIGS. 6 and 7. However, the latching arm and other variations of the latching extension may also attach directly to the support frame where the support frame does not have a locking plate.

Additionally, in the preferred embodiment the latching mechanism extends from the chassis and is removably connected to the subframe's support frame but it should be appreciated that the fixed end of the latching extension is not limited to being attached to the chassis. Accordingly, the latching extension may be fixedly attached to the support frame assembly 14, as shown in FIGS. 7A and 7B, and removably engage the chassis during the loading operation. Further, the latching extension and locking plate may be made of any number of materials sufficient to connect the subframe to the chassis while maintaining the desired load angle discussed herein, including metal, wood, plastic, wire and other similar materials.

Generally, the latching extension prevents the support frame from over-rotating when the support frame is rotated to the preferred thirteen degree (13°) load angle 32. For loading conditions in which the force of an overhung load exceeds the holdback strength of the pivotal actuator, the latching extension provides the counteracting force which holds the bed at its preferred rollback load angle while the bed translates along its longitudinal axis between the forward retracted position and rearward extended positions. Accordingly, the latching extension of the present invention significantly expands the operating envelope for the rollback loading operations of rollback dump trucks as compared with previously known rollback dump trucks which do not lock the load angle.

Figure 1A:
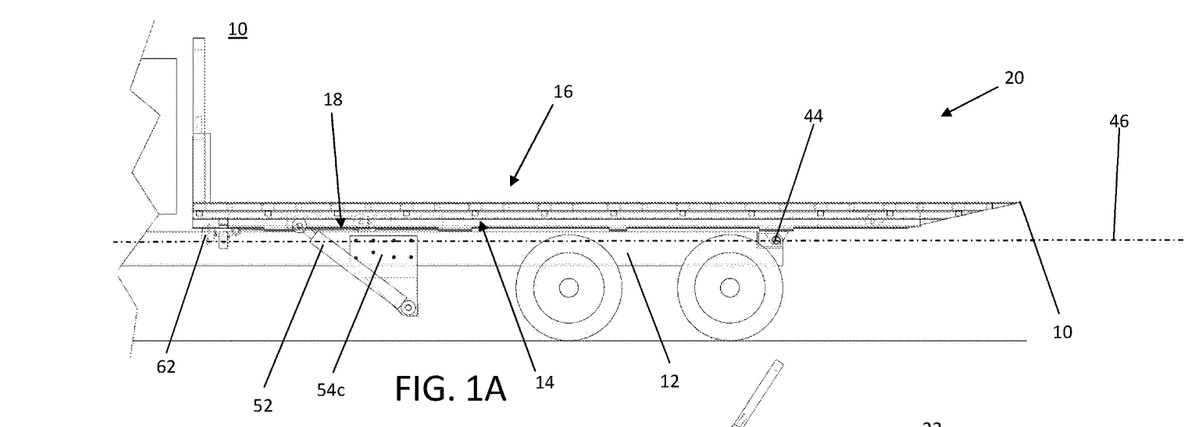
FIGS. 1A-1D are side cross-sectional views of the rollback dump truck in several operational positions.
Figure 1B:
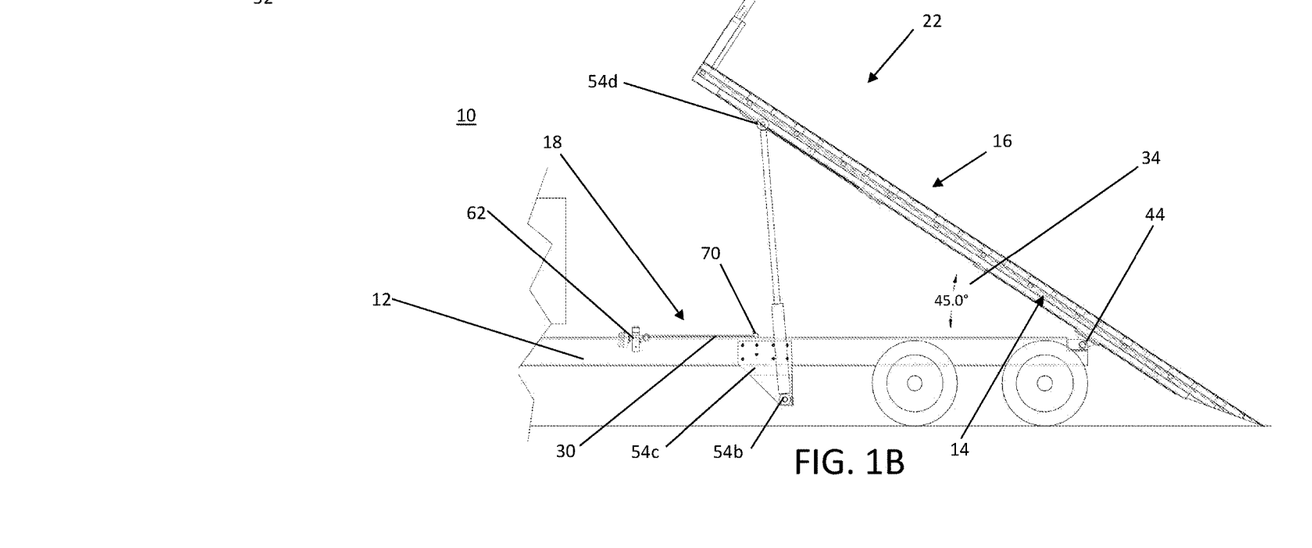

The latching extension has an engaged orientation shown in FIGS. 1C, 1D, 7 and 8 and a stowed orientation shown in FIGS. 1A and 1B. While in the dumping operation or the driving position 20, the latching extension is disengaged from the subframe and held parallel to the chassis in the stowed orientation below the subframe assembly, as shown in FIG. 1B or disengaged from the chassis and held within the subframe in an alternative embodiment. Conversely, in the engaged orientation the latching extension is removably connected to the subframe or chassis and latches the subframe to the chassis at the preferred load angle as the subframe is rotated away from the chassis during the loading operation.

Figure 5A:
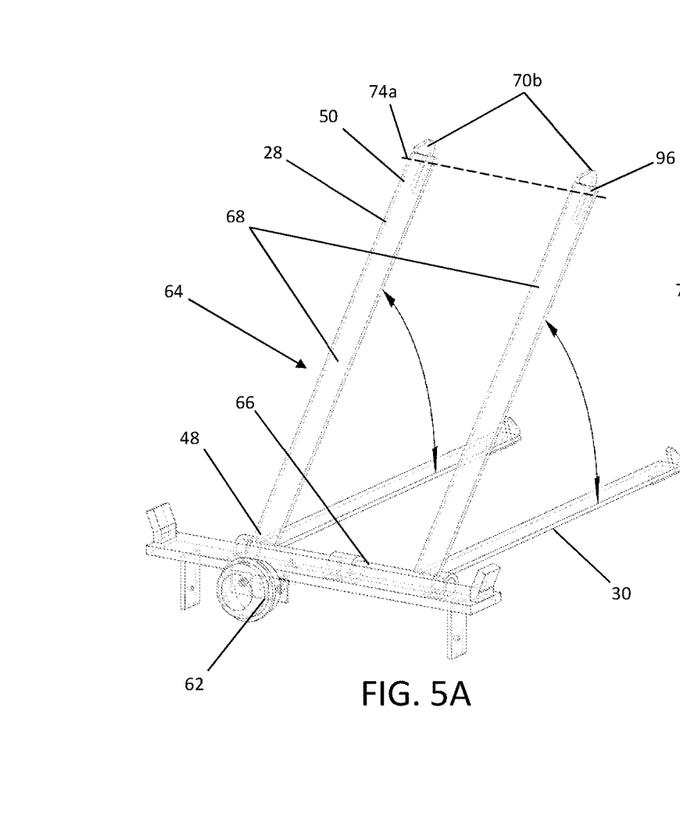
FIGS. 5A and 5B respectively show a perspective view and a side view of the latching extension in a stowed orientation and in an actuated orientation.
Figure 5B:
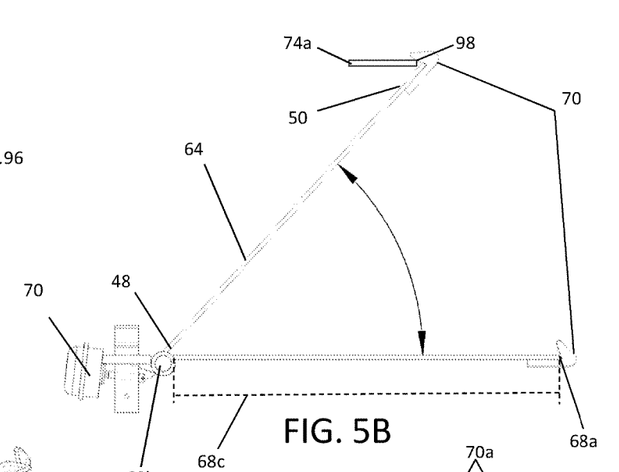

The preferred latching extension depicted in FIGS. 5A and 5B is a locking arm 64 made up of a pair of pivot arms 68 attached to a pivot rod 66 at their distal ends 68a and the pivot rod is mounted between the sides of the chassis. When engaged, the pivot arms rotate in unison about the pivot rod until a latching connector 70 attached to the proximal end 68b of the pivot arm a distance 68c away from the pivot rod engages the subframe and thus latches the subframe to the chassis at the preferred load angle. However, a single pivot arm or a pair of individual pivot arms could be mounted on opposite sides of the chassis and function to similarly latch the chassis to the subframe at the desired load angle.

In one embodiment, as shown in FIG. 6, pins 70a are used as the latching connection as they are attached to the proximal end of each of the pivot arms, perpendicular to the arm's longitudinal axis. When engaged in the load position, the arms pivot into slots 74b cut from the locking plate and the latching extension is secured thereto by the pins. In another embodiment shown in FIGS. 5A and 5B, the pair of pivot arms have hooks 70b attached to their proximal ends and the locking plate does not have any slots cut therefrom. Accordingly, when engaged the hooks of the pivot arms hook onto the locking plate and prevent the subframe from rotating past the desired load angle. Although the preferred embodiments include a pair of pivot arms, other latching extensions can be used which may include any number of latching arms or other latching mechanisms.

Figure 8:
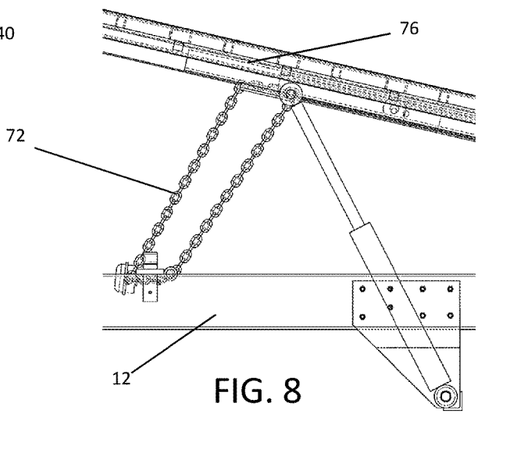
FIG. 8 is a side view of an alternative embodiment of the latching extension using a chain.
Figures 9A, 9B, 9C:
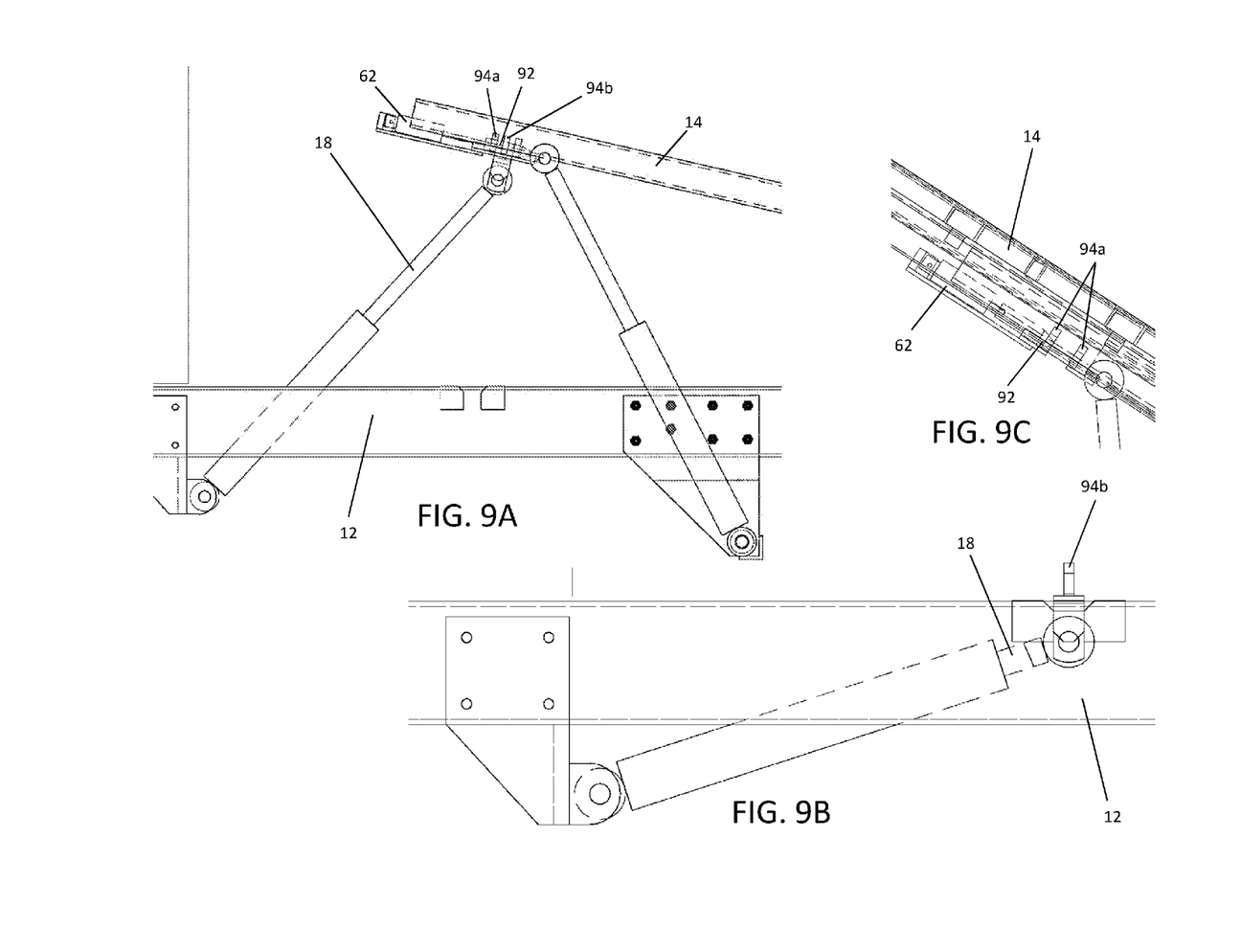
FIG. 9A is a side view of a latching extension that is formed from a hydraulic piston with an actuated pin in the load position.
FIGS. 9B and 9C are side detail views of the chassis and subframe assembly, respectively, with having a latching extension that is formed from a hydraulic piston with an actuated pin in the dump position.

It should be appreciated that the present invention is not limited to the latching extensions described above but may also include a chain 72 as shown in FIG. 8, a cable (not shown), or any other similarly flexible latching mechanism. Preferably, the chain would have a hook at its distal end, although it could alternatively be pinned. As shown in FIG. 9, an alternative embodiment can have a latching extension consisting of a hydraulic piston with an actuated pin 92 that extends through a subframe bracket 94a and a mating bracket 94b. As shown in the load position in FIG. 9A the actuated pin protrudes through apertures in the subframe bracket attached to the subframe and the mating bracket attached to the latching extension. Conversely as shown in FIGS. 9B and 9C, the latching extension is stowed within the chassis in the dump position and the actuated pin does not extend through the subframe bracket or the mating bracket where it remains proximate to the chassis attached to the end of the locking extension. An actuator preferably moves the actuated piston into and out of the brackets. Although the actuator is depicted along the longitudinal axis of the subframe, an alternative embodiment could have an actuator along the lateral axis of the subframe with the brackets accordingly rotated 90°.

In the stowed orientation, the proximal first end of the latching extension is fixedly attached to either the support frame or the chassis and the opposite second end is disengaged from the opposite frame. In the preferred embodiment, one end of the latching extension remains attached to the chassis and the opposite end is disengaged from the support frame. As shown in FIG. 1B, the latching extension in the preferred embodiment is attached at a point on the interior of the chassis and is stowed under the subframe in the stowed orientation. However, this mounting arrangement is not intended to be limiting and the latching extension may be attached on other positions of the chassis and subframe including the outside, top and bottom, and subsequently stowed in those locations when in the stowed orientation. Additionally, the end of the latching extension that is fixedly attached to the rollback dump truck may be attached to the support frame rather than the chassis, shown in FIG. 7. Accordingly, the latching extension may be stowed in the subframe in the stowed orientation of this embodiment. Further, other embodiments may have latching extensions that are completely removable when not being used, like a chain or cable, that can be stowed elsewhere like the cab of the truck.

Figure 1C:
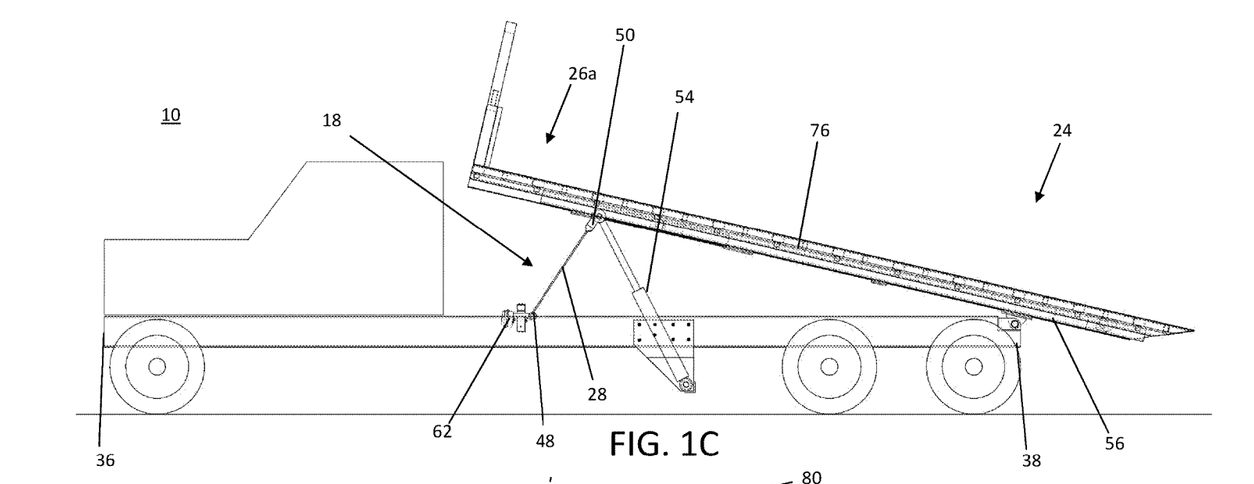
Figure 1D:
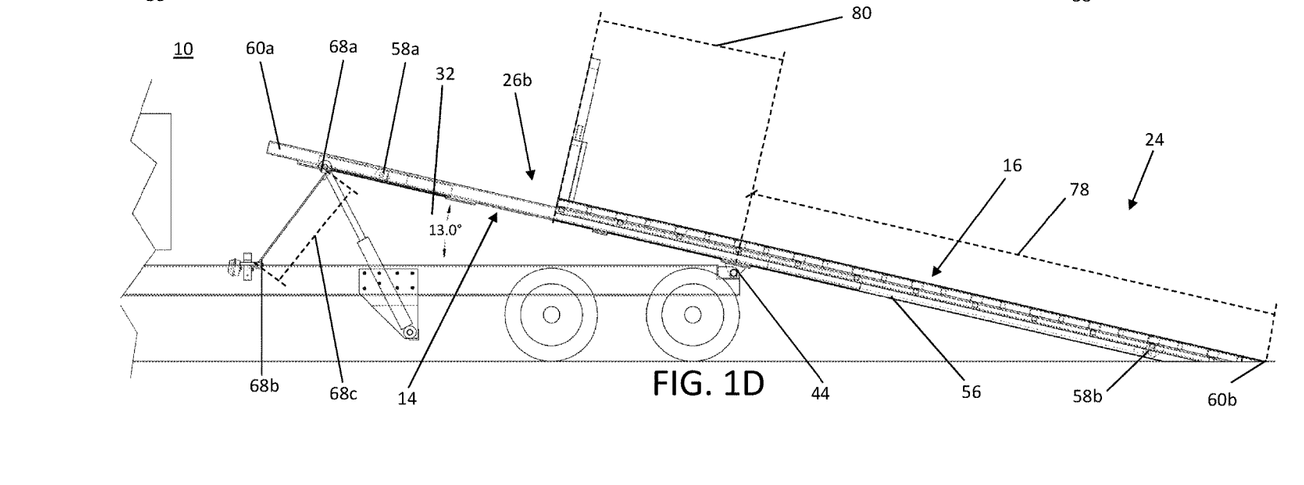

During the loading operation illustrated in FIGS. 1C and 1D the latching extension is in the engaged orientation and connects the subframe assembly to the chassis of the rollback dump truck throughout the loading operation. When engaged, the latching extension restricts pivotal movement of the subframe assembly and maintains a desired load angle. Accordingly, the subframe assembly is pivoted off of the chassis to the preferred load angle of thirteen degrees (13°) but at least between nine degrees (9°) and fifteen degrees (15°) and the latching extension is engaged. As indicated above, acceptable load angles are typically less than twenty degrees (<20°). Once the latching extension is engaged, the subframe assembly may not pivot beyond the desired load angle until the latching extension has been disengaged.

The pivot actuator raises the support frame away from the chassis and the latching extension is engaged as shown in FIG. 1C with the bedframe in a forward position, prerollback. Subsequently, the slide actuator slides the bed frame along the longitudinal axis of the support frame to the rearward position with the rear edge 60b touching the ground. As depicted in FIG. 1D when the bed frame is fully rolled back into the load position with the rear edge of the bed frame on the ground, the first distance 78 between the rear edge and pivot point is at least twice as long as the second distance 80 between the front edge of the bed frame and the pivot point. Of course the preferred load angle is maintained throughout the process by the latching extension connecting the subframe and chassis. To facilitate the sliding motion, the slide actuator slidably attaches the support frame to the bed frame. The slide actuator is preferably suspended below the bedframe with its forward end 58a connected to the support frame proximate to the front edge of the bed frame and its rearward end 58b connected to the bed frame proximate to the rear edge of the bedframe. Accordingly, when the slide actuator is enabled the bed frame moves along the longitudinal axis of the support frame.

In the preferred embodiment, the slide actuator is a hydraulic actuator, but other embodiments may have an electric actuator, air actuator, manually actuated mechanism or other similar actuation systems. Additionally, the slide actuator may also slide the bedframe during the dump operation and the rear edge of the bedframe may also be extended until it reaches the ground to better facilitate the dumping operation described below. It will also be appreciated that the bed could have a winch attached to its topside for pulling loads from the ground onto the bed as it is inclined at the load angle and then up the bed.

Figure 2:
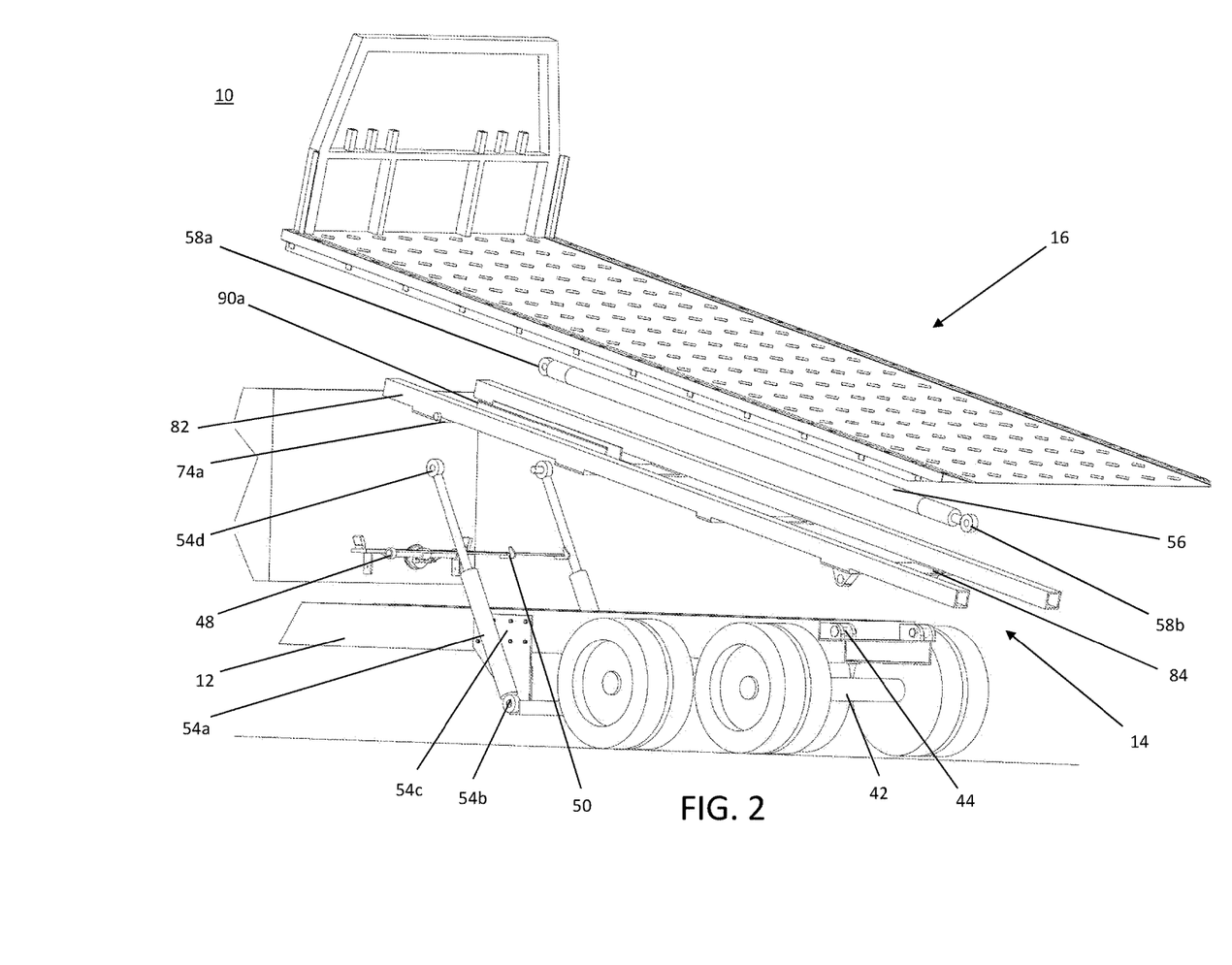
FIG. 2 is an exploded perspective view of the rollback dump truck.

In operation the slide actuator moves the bed frame along the longitudinal axis of the support frame. Although the relative movement is an aspect of the rollback dump truck described herein, the relation between the support frame and the bed frame can be achieved through any number of configurations. As generally shown in FIG. 2 and more particularly shown in FIGS. 3 and 4, the support frame assembly 14 is made up of a pair of longitudinal guide rails 82 substantially parallel with the chassis and a series of crossbeams 84 extending between the guide rails 82. As also particularly shown in FIGS. 3 and 4, the bed frame assembly 16 includes the bed 86 and bed frame rails 88. The support frame assembly also includes a front actuator bracket assembly 90a to which the slide actuator's front end 58a is secured, and the bed frame assembly includes a rear actuator bracket assembly 90b to which the slide actuator's rear end 58b is secured.

Figures 3A, 3B:
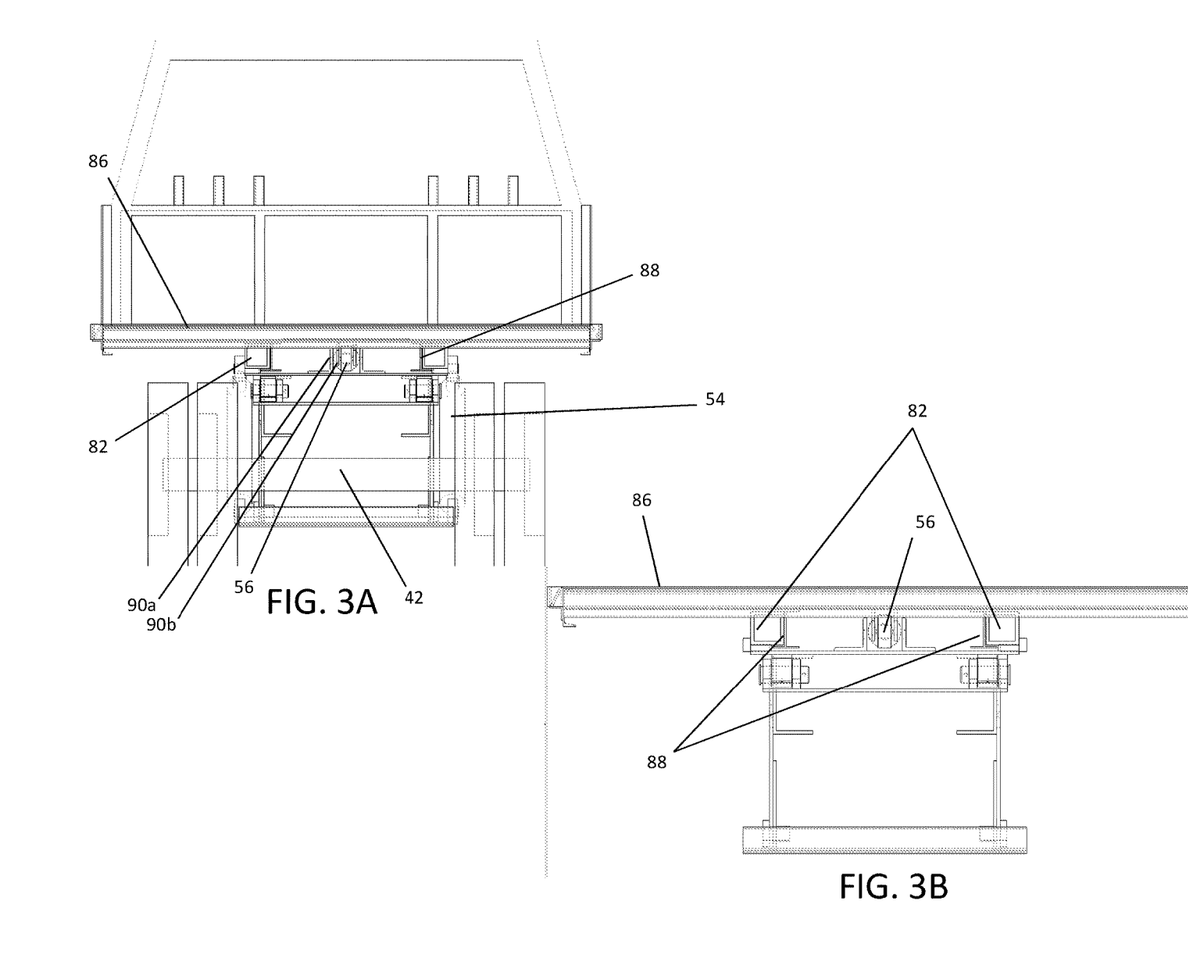
FIGS. 3A and 4A are rear cross-sectional views of the rollback dump truck according to an outer frame embodiment and an inner frame embodiment, respectively.
FIGS. 3B and 4B are rear detail views of the rollback dump truck according to an outer frame embodiment and an inner frame embodiment, respectively.
Figures 4A, 4B:
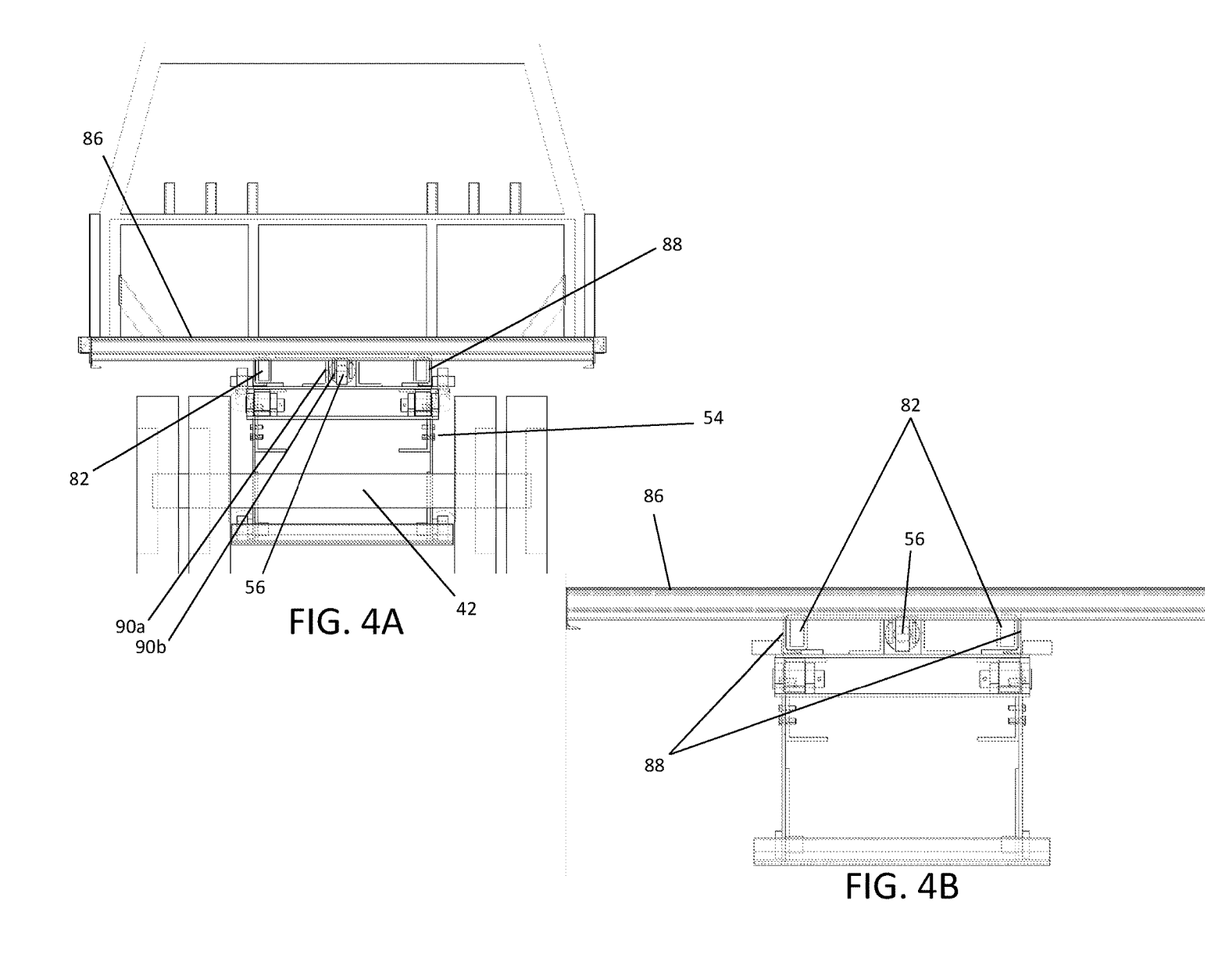

The embodiment depicted in FIGS. 3A and 3B has an outside subframe arrangement with the longitudinal guide rails 82 being located outwardly of the bed frame rails 88 (I-channel version). Accordingly, as explained above, the bed frame rails are slideably connected to the support frame assembly 14 on the inside of the longitudinal guide rails 82. The embodiment depicted in FIGS. 4A and 4B has an inside subframe arrangement with the longitudinal guide rails 82 being located inwardly of the bed frame rails 88 (C-channel version). Accordingly, in this embodiment, the bed frame rails are slideably connected to the support frame assembly 14 along the outside of the longitudinal guide rails 82. Similarly and as previously mentioned herein, the latching extension can be mounted on both the exterior and interior of the chassis frame as well as the guide rails of the support frame. Thus, the mounting means of the latching extension and the sliding relationship between the bed frame and the support frame can be achieved in multiple ways, including ways not described herein.

Once in the load position, a vehicle, excavator, or other equipment may be driven onto the bed frame which is subsequently pulled back onto the chassis by the slide actuator until the subframe assembly is again horizontally held over the chassis in the drive position as shown in FIG. 1A. Because the latching extension is engaged during loading, the load angle is held constant and the angle of the bed frame does not steepen as its center of gravity moves past the pivot axis.

It should also be appreciated that the loaded bed's center of gravity ($CG_{LoadedBed}$) will move relative to the pivot point during the loading operation. Although the center of gravity moves, the latching extension holds the load angle constant and prevents the over-rotation steepening of the subframe assembly when the center of gravity is behind the pivot point. Accordingly, once the bed frame and load are fully slid back over the chassis from the load position, the latching extension is disengaged and the subframe may return to a horizontal drive position with the subframe being substantially parallel with the chassis and ground. It will be appreciated that the bed has its own center of gravity ($CG_{Bed}$), and the loaded bed's center of gravity will vary depending on the center of gravity of the load being carried by the bed and the relative location of the load's GG ($CG_{Load}$) on the bed.

In addition to the load operation and load positions described above, the rollback dump truck also has the aforementioned drive position and a dump position. During the dumping operation shown in FIG. 1B, the subframe assembly is pivoted away from the chassis about the pivot axis to the desired dump angle 34 by the pivot actuator. In the preferred embodiment the rollback dump truck has a dump angle of forty-five degrees (45°). However other embodiments may have an acceptable dump angle of at least thirty-five degrees (35°). Regardless of the particular dump angle it is an aspect of the rollback dump truck to have a dump angle that is greater than twice load angle as the locking extension does not restrict pivotal movement during the dumping operation. Accordingly, the latching extension is not in the engaged orientation during the dumping operation and the pivotal movement of the subframe assembly is not restricted to the rollback loading angle which in the preferred embodiment can be less than half the dump angle. During the dump operation, the pivotal actuator raises the subframe assembly about the hinge point until it reaches the desired dump angle to effectively dump the load held within the bed frame. Once dumped, the subframe assembly returns to the drive position shown in FIG. 1A for subsequent loading or travel. In the drive position the longitudinal axis of the subframe is substantially horizontal and parallel with the longitudinal axis of the chassis and the locking mechanism is stowed. Accordingly, loads can be secured to the bed frame and driven to their destination.

In the preferred embodiment the pivotal actuator is a telescoping hoist, depicted in FIG. 2, but other hoists capable of lifting the subframe of a dump truck like a scissor hoist may also be used. The pivot actuator causes pivotal movement of the subframe relative to the chassis as the support frame rotates to the load position and dump position 22 about the pivot axis. The pivot actuator is preferably a pair of telescoping hydraulic hoists 54a attached between the chassis and the support frame. As exploded in FIG. 2 and shown in FIGS. 1B, 1C and 1D, the lower end 54b of the hoists are attached to the chassis by a mounting bracket 54c and the upper ends 54d of the hoists are attached to the bottom side of the support frame proximate to the front edge 60a. Accordingly, when the hoists are actuated they raise the front edge of the subframe to the desired dump and load angles which also may be restricted by the latching extension during the loading operation.

In another embodiment the latching extension is replaced with a subframe extension restrictor. In such an embodiment, the extension restrictor does not necessarily connect the subframe assembly to the chassis but merely restricts the orientation of the subframe assembly to the chassis. Like the latching extension, the restrictor holds the load angle constant to prevent steepening of the subframe assembly during loading. Accordingly, when the restrictor is engaged while sliding the bed frame toward the loading position, the loading angle can then be controlled to a safer, lower and more desirable load angle. Additionally, when equipment is being loaded onto the bed in the load position, the restrictor will maintain the desired loading angle and not allow the downward force of the load to raise the front portion of the bed vertically, causing the subframe assembly to steepen. However, like the latching extension, the restrictor can also be disengaged to allow the subframe assembly to pivot to a desired dumping angel and position during the dumping operation.

The rollback dump truck described herein also has a preferred method of operation when moving the bed and subframe between the multiple loading and dumping position. When loading the truck the driver should first position the truck for loading by parking the truck with the rear of the bed approximately twelve feet from the object to be loaded and in line with the object. Once positioned, the parking brake should be set and the engine left running while engaging the Power Take Off ("PTO"). Next, the operator should operate the PTO pivotal actuator to raise the bed to the preferred lock angle as shown as a "lock line" on the cab of the truck. Once the subframe is raised to the lock line, the latching extension should be moved into the engaged orientation as described herein. If the preferred pivot arms or similar locking arm is used, the end of the arm should be approximately 1" away from the locking plate when the bed is in its forward position to allow sufficient slack so that the arm can freely disengage from the locking plate when the bed it ready to be lowered from the loading position to the travel position. When the bed is slid back from its forward position to the rearward position, the center of gravity shifts so that the small gap 96 between the end of the arm and the locking plate is closed until the end of the arm makes a contact 98 with the locking plate without any gap at which point the arm locks the bed at the loading angle and prevents the bed from over-rotating. Once locked, the operator should engage the sliding actuator and move the bed rearward until the bed contacts the ground. Once fully slid rearward, the weight distribution between the rear bumper and the end of the deck should be evenly distributed and the 1" gap should be closed because of the shift in the center of gravity. Accordingly, the truck is in the full load position and the latching extension is engaged and locked.

Once in the full load position, workers can manually or with a winch load equipment on the bed but should attempt to center the load on the bed, if possible. Once the load is positioned on the deck, it should also be secured and prevented from moving in all directions with tie-downs before transport. Subsequently, the operator can engage the slide actuator once again and move the bed into the forward position until it reaches the forward position and the locking extension can be disengaged. As the loaded bed's center of gravity passes over the pivot point of the bed, the gap between the end of the arm and the locking plate should again open as the weight is borne by the pivotal actuator. As indicated above, the gap allows the end of the arm to disengage from the locking plate without any binding between the arm and the plate when the bed is in the forward loading position while the contact between the arm and the locking plate prevents the over-rotation of the bed when it is in its rearward loading position. Once the subframe has fully returned to the drive position, the operator should return the engine to normal idle speed and disengage the PTO before engaging the transmission. It will also be appreciated that driving a truck with the PTO engaged will cause over speeding. Over speeding of the PTO and/or pump will greatly shorten their life and can cause damage to the PTO, pump, and transmission.

To unload the deck the truck should once again be in park with the rear of the deck approximately twelve feet from the desired position of load being unloaded; the parking brake is set, and the engine is running to engage the PTO. Next, the bindings holding the load in place should be partially released but only to a point where there is still restrain against movement of the load in any direction. Subsequently, the subframe is once again raised to the lock line on the cab and the locking extension is engaged and visually checked. As with loading, the latch should be approximately 1" away from the locking plate to provide the gap that prevents binding by allowing for the shifting of the bed when the center of gravity of the load moves during sliding. Finally, the slide actuator can be engaged and the bed can extend rearward until the bed has contacted the ground and there is an equal weight distribution between the rear bumper and the end of the deck.

During this unloading process the winch cable remains securely attached to the load and is taunt with the winch still being engaged rather than in a free spool mode. Subsequently all other ties and securing means can be removed and the winch can control the power unreeling of the drum and thereby lowering the load from the deck. Once fully unloaded, the load should be secured on the ground and the winch cable can be removed and stored before returning the truck to the drive position once again.

During the loading operation that will eventually be dumped in the full dump position the operator should first make certain there is proper clearance for the loader both from side to side and overhead. Once positioned the parking brake should be set and the PTO engaged with the engine running. With a loader or other means the load should be evenly distributed side to side on the bed and loaded from the front to the rear. Additionally, when the load is loaded with an end loader, the load should be loaded from the center of the chassis' sides. When loading with a hopper the chassis of the truck should be centered from side to side under the hopper opening and with the hopper opening slightly forwards of the center of the body. Lastly, the load must not be higher than the sides of the dump body or the sideboards.

To dump the load the operator should first make sure the terrain is level, even and firm and should not attempt to dump if there is a significant sideways slope 6 degrees or greater to the ground, or if it appears exceptionally muddy or moist. Additionally the operator should check carefully for overhead obstructions and should never raise the body or dump under a power line. The operator should also check to make certain how many persons are in the vicinity where dumping will take place, make certain all personnel are cautioned to stay out of the area where the load may discharge and when dumping, make sure all personnel are accounted for, in sight and out of the discharge area. Lastly, the operator should check the dumping area carefully to make certain that there is adequate clearance for the load to discharge, both to the rear and the side of the unit as when the load discharges, it will spread not only to the back of the truck, but also to the sides. Once the safety checks are complete, the pivotal actuator can be engaged and the subframe can be rotated into the dump position as described herein.

The embodiments of the rollback dump truck were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. The present invention has additional advantages over the traditional trucks that combine features of dump trucks and roll back trucks. Thus, the breadth and scope of the present invention should not be limited by any of the above-described exemplary embodiments, but should be defined only in accordance with the following claims appended hereto and their equivalents.

What is claimed is:

1. A rollback dump truck comprised of:
   a chassis comprised of a front end, a rear end, a pair of sides, and a rear wheel axis, wherein the rear wheel axis laterally extends between the pair of sides proximate to the rear end;
   a support frame rotatably connected to the chassis, wherein the support frame rotates relative to the chassis about a pivot axis, and wherein the pivot axis is parallel to the rear wheel axis;
   a bed frame slidingly connected to the support frame, wherein the bed frame slides relative to the support frame along a longitudinal axis perpendicular to the pivot axis;
   a pivotal actuator causing pivotal movement of the support frame relative to the pivot axis, wherein the pivotal actuator rotates the support frame between a drive position, a dump position and a load position, wherein the dump position is comprised of a dump angle between the chassis and the support frame, wherein the load position is comprised of a load angle between the chassis and the support frame, and wherein the load angle is less than the dump angle;
   a slide actuator causing sliding movement of the bed frame relative to the support frame when the support frame is in the load position, wherein the bed frame slides between a forward position and a rearward position; and
   a latching extension comprised of a first end and a second end, wherein the first end is fixedly connected to at least one of the chassis and the support frame, wherein the second end has a releasable connection to the other of the chassis and the support frame, wherein the latching extension is further comprised of an engaged orientation and a stowed orientation, wherein the engaged orientation of the latching extension restricts pivotal movement of the support frame when it is in the load position and prevents the support frame from pivoting toward the dump position beyond the load angle.

2. The rollback dump truck of claim 1, wherein the second end of the latching extension is connected to at least one of the chassis and the support frame in the engaged orientation, and wherein the second end of the latching extension is disconnected from at least one of the chassis and the support frame in the stowed orientation.

3. The rollback dump truck of claim 1, wherein the load angle is greater than nine degrees and less than fifteen degrees, wherein the support frame has a front edge closer to the front end of the chassis than to the rear end and a rear edge extending past the rear end of the chassis, and wherein the latching extension is closer to the front edge of the support frame than the rear edge.

4. The rollback dump truck of claim 1, wherein the longitudinal axis of the support frame is substantially parallel to the sides of the chassis in the drive position, wherein the dump position is comprised of the dump angle between the chassis and the support frame with the bed frame in the forward position, wherein the latching extension is in the stowed orientation in the dump position and the drive position, and wherein the load angle is less than approximately half the dump angle.

5. The rollback dump truck of claim 4, wherein the dump angle is greater than thirty-five degrees, and wherein the load angle is less than twenty degrees.

6. The rollback dump truck of claim 1 further comprised of a latch engaging mechanism wherein the latch engaging mechanism moves the second end of the latching extension to engage with at least one of the chassis and the support frame in the engaged orientation and moves the second end of the latching extension to disengage from at least one of the chassis and the support frame in the stowed orientation, wherein the pivotal actuator is comprised of a pair of telescoping hoists, wherein each one of the hoists has a lower end connected to a mounting bracket attached to the chassis and an upper end connected to the bottom side of the support frame, and wherein the slide actuator is positioned below the bed frame and comprises a forward end connected proximate to a front edge of the support frame and a rearward end connected proximate to a rear edge of the bed frame.

7. The rollback dump truck of claim 6, wherein the latch engaging mechanism is at least one of the group consisting of a hydraulic actuator, an air actuator, an electric actuator, and a manual engaging mechanism.

8. The rollback dump truck of claim 6, wherein the bed frame slides relative to the support frame between the forward position and the rearward position, wherein the rearward position comprises a first distance between the pivot axis and the rear edge of the bed frame and a second distance between the pivot axis and a front edge of the bed frame, wherein the first distance is at least twice the second distance, wherein the releasable connection of the latching extension in the engaged orientation is further comprised of a gap between the second end and at least one of the chassis and the support frame when the bed frame is in the forward position, wherein the releasable connection of the latching extension in the engaged orientation is further comprised of a contact without any gap between the second end and at least one of the chassis and the support frame when the bed frame is in the rearward position, wherein the gap prevents a binding of the second end of the latching extension when the bed frame slides from the rearward position to the forward position, and wherein the contact locks the bed frame in a load angle and prevents an over-rotation of the bed frame as the bed frame slides from the forward position to the rearward position.

9. The rollback dump truck of claim 1, wherein the latching extension is at least one of a locking arm, an actuated pin, a chain, and a cable, wherein the locking arm comprises a pivot rod, a pivot arm and a latching connection, wherein the pivot rod is connected to at least one of the chassis and the support frame, wherein a distal end of the pivot arm is attached to the pivot rod and extends a distance to the latching connection at a proximal end, wherein the actuated pin extends through a subframe bracket affixed to the subframe and a mating bracket affixed to the second end of the latching extension in the engaged orientation, and wherein the latching connection engages the other of the chassis and the support frame in the engaged orientation.

10. The rollback dump truck of claim 1, wherein at least one of the chassis and the support frame is further comprised of a locking plate, wherein the second end of the latching extension is releasably connected to the locking plate in the engaged orientation.

11. A rollback dump truck comprised of:
a chassis comprised of a front end, a rear end, a pair of sides, and a rear wheel axis, wherein the rear wheel axis laterally extends between the pair of sides proximate to the rear end;
a support frame assembly comprised of a support frame and a pivotal actuator, wherein the support frame is rotatably connected to the chassis by the pivotal actuator, wherein the support frame rotates relative to the chassis about a pivot axis, wherein the pivot axis is parallel to the rear wheel axis, wherein the pivotal actuator rotates the support frame between a drive position, a dump position and a load position, wherein the dump position is comprised of a dump angle between the chassis and the support frame, wherein the load position is comprised of a load angle between the chassis and the support frame, and wherein the load angle is less than approximately half the dump angle;
a bed frame slidingly connected to the support frame by a slide actuator, wherein the slide actuator slides the bed frame relative to the support frame along a longitudinal axis perpendicular to the pivot axis, and wherein the bed frame slides relative to the support frame between a forward position and a rearward position; and
a latching extension comprised of a first end and a second end, wherein the first end is fixedly connected to at least one of the chassis and the support frame, wherein the second end has a releasable connection to the other of the chassis and the support frame, wherein the latching extension is further comprised of an engaged orientation and a stowed orientation wherein a latch engaging mechanism moves the second end of the latching extension to engage with at least one of the chassis and the support frame in the engaged orientation and moves the second end of the latching extension to disengage from at least one of the chassis and the support frame in the stowed orientation, wherein the latching extension is in the stowed orientation in the dump position and the drive position, wherein the latching extension is in the engaged orientation in the load position, and wherein the latching extension restricts pivotal movement of the support frame to the load angle in the engaged orientation.

12. The rollback dump truck of claim 11, wherein the releasable connection of the latching extension in the engaged orientation is further comprised of a gap between the second end and at least one of the chassis and the support frame when the bed frame is in the forward position, wherein the releasable connection of the latching extension in the engaged orientation is further comprised of a contact without any gap between the second end and at least one of the chassis and the support frame when the bed frame is in the rearward position, wherein the gap prevents a binding of the second end of the latching extension when the bed frame slides from the rearward position to the forward position, and wherein the contact locks the bed frame in the load angle and prevents an over-rotation of the bed frame as the bed frame slides from the forward position to the rearward position.

13. The rollback dump truck of claim 11, wherein the pivotal actuator is comprised of a pair of telescoping hoists, wherein each one of the hoists has a lower end connected to a mounting bracket attached to the chassis and an upper end connected to the bottom side of the support frame, and wherein the slide actuator is positioned below the bed frame and comprised of a forward end connected proximate to a front edge of the support frame and a rearward end connected proximate to a rear edge of the bed frame.

14. The rollback dump truck of claim 11, wherein the latch engaging mechanism is at least one of the group consisting of a hydraulic actuator, an air actuator, an electric actuator, and a manual engaging mechanism.

15. The rollback dump truck of claim 11, wherein the load angle is greater than nine degrees and less than fifteen degrees.

16. The rollback dump truck of claim 11, wherein the latching extension is at least one of a locking arm, a chain, and a cable, wherein the locking arm comprises a pivot rod, a pivot arm and a latching connection, wherein the pivot rod is connected to at least one of the chassis and the support frame, wherein a distal end of the pivot arm is attached to the pivot rod and extends a distance to the latching connection at a proximal end, and wherein the latching connection engages the other of the chassis and the support frame in the engaged orientation.

17. A rollback dump truck comprised of:
a chassis comprised of a front end, a rear end, a pair of sides, and a rear wheel axis, wherein the rear wheel axis laterally extends between the pair of sides proximate to the rear end;
a support frame assembly comprised of a support frame and a pivotal actuator, wherein the support frame is rotatably connected to the chassis by the pivotal actuator, wherein the support frame rotates relative to the chassis about a pivot axis, wherein the pivot axis is parallel to the rear wheel axis, wherein the pivotal actuator rotates the support frame between a drive position, a dump position and a load position, wherein the dump position is comprised of a dump angle between the chassis and the support frame, wherein the load position is comprised of a load angle between the chassis and the support frame, and wherein the load angle is greater than nine degrees and less than fifteen degrees, and wherein the dump angle is greater than thirty-five degrees;
a bed frame slidingly connected to the support frame by a slide actuator, wherein the slide actuator slides the bed frame relative to the support frame along a longitudinal axis perpendicular to the pivot axis, and wherein the bed frame slides relative to the support frame between a forward position and a rearward position in the load position; and
a latching extension comprised of a first end and a second end, wherein the first end is fixedly connected to at least one of the chassis and the support frame, wherein the second end has a releasable connection to the other of the chassis and the support frame, wherein the latching extension is further comprised of an engaged orientation and a stowed orientation, wherein a latch engaging mechanism moves the second end of the latching extension to engage with at least one of the chassis and the support frame in the engaged orientation and moves the second end of the latching extension to disengage from at least one of the chassis and the support frame in the stowed orientation, wherein the latching extension is in the stowed orientation in the dump position and the drive position, and wherein the latching extension is in the engaged orientation in the load position.

18. The rollback dump truck of claim 17, wherein the latching extension restricts pivotal movement of the support frame to the load angle in the engaged orientation in the load position and prevents an over-rotation of the bed frame as the bed frame slides from the forward position to the rearward position in the load position.

19. The rollback dump truck of claim 17, wherein the pivotal actuator is comprised of a pair of telescoping hoists, wherein each one of the hoists has a lower end connected to a mounting bracket attached to the chassis and an upper end connected to the bottom side of the support frame, and wherein the slide actuator is positioned below the bed frame and comprised of a forward end connected proximate to a front edge of the support frame and a rearward end connected proximate to a rear edge of the bed frame.

20. The rollback dump truck of claim 19, wherein the rearward position comprises a first distance between the pivot axis and the rear edge of the bed frame and a second distance between the pivot axis and a front edge of the bed frame, and wherein the first distance is at least twice the second distance.

* * * * *